United States Patent
Kubo et al.

(10) Patent No.: US 10,670,981 B2
(45) Date of Patent: Jun. 2, 2020

(54) TONER FOR ELECTROPHOTOGRAPHY

(71) Applicant: KAO CORPORATION, Tokyo (JP)

(72) Inventors: Takashi Kubo, Wakayama (JP); Kota Ijichi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/077,111

(22) PCT Filed: Feb. 9, 2017

(86) PCT No.: PCT/JP2017/004770
§ 371 (c)(1),
(2) Date: Aug. 10, 2018

(87) PCT Pub. No.: WO2017/141817
PCT Pub. Date: Aug. 24, 2017

(65) Prior Publication Data
US 2019/0049868 A1 Feb. 14, 2019

(30) Foreign Application Priority Data
Feb. 16, 2016 (JP) .................................. 2016-027238

(51) Int. Cl.
G03G 9/087 (2006.01)
C08G 63/685 (2006.01)

(52) U.S. Cl.
CPC ....... G03G 9/08755 (2013.01); C08G 63/685 (2013.01); C08G 63/6856 (2013.01); G03G 9/087 (2013.01)

(58) Field of Classification Search
CPC ............... G03G 9/08755; G03G 9/087; C08G 63/6856; C08G 63/685
See application file for complete search history.

(56) References Cited

U.S. PATENT DOCUMENTS

| | | | |
|---|---|---|---|
| 3,366,591 A | 1/1968 | Marshall et al. | |
| 3,985,664 A | 10/1976 | Sakaguchi et al. | |
| 4,601,966 A | 7/1986 | Grashof et al. | |
| 5,646,236 A * | 7/1997 | Schafheutle | C08G 63/16 528/272 |
| 2003/0144457 A1 | 7/2003 | Brinkhuis | |
| 2007/0117739 A1* | 5/2007 | Fujii | A61K 8/41 510/499 |
| 2012/0065356 A1 | 3/2012 | Eritate et al. | |
| 2013/0236636 A1* | 9/2013 | Nobuta | H01G 9/0036 427/80 |
| 2013/0244173 A1 | 9/2013 | Qiu et al. | |

FOREIGN PATENT DOCUMENTS

| | | |
|---|---|---|
| JP | 50-99742 A | 8/1975 |
| JP | 2010-280776 A | 12/2010 |
| WO | WO 03/054060 A1 | 7/2003 |

OTHER PUBLICATIONS

Supplementary Search Report dated Jul. 26, 2019 issued in corresponding European patent application No. 17753075.

* cited by examiner

Primary Examiner — Thorl Chea
(74) Attorney, Agent, or Firm — Oblon, McClelland, Maier & Neustadt, L.L.P.

(57) ABSTRACT

To provide a toner for electrophotography and a binder resin, exhibiting an excellent fog suppression capability.

A toner for electrophotography and a binder resin each containing a resin A having at least a polyester moiety obtained through polycondensation of an alcohol component, a carboxylic acid component, and a polyhydroxyamine compound represented by the formula (1) in an amount of 0.01% by mass or more and 5.0% by mass or less based on the total amount of all the monomer components of the resin A.

8 Claims, No Drawings

TONER FOR ELECTROPHOTOGRAPHY

FIELD OF THE INVENTION

The present invention relates to a toner for electrophotography and a binder resin.

BACKGROUND OF THE INVENTION

According to the speeding up and energy saving of printers and duplicators in recent years, a toner capable of responding to the demand is becoming necessary.

PTL 1 describes about a production method of a binder component of a toner for electrophotography. The literature targets to achieve such demands that, for example, fusing is performed at a lower temperature, offset is prevented at a higher temperature, a stable image is formed even though the environmental conditions, such as the humidity, largely fluctuate, and excellent charge rise is achieved. PTL 1 describes a production method of a carbodiimide-modified polyester resin characterized by reacting a polyester resin (A) and a carbodiimide group-containing compound (B).

PTL 1: JP 2000-336163 A

SUMMARY OF THE INVENTION

The present invention relates to the following items [1] and [2].

[1] A toner for electrophotography containing a resin A having at least a polyester moiety obtained through polycondensation of an alcohol component, a carboxylic acid component, and a polyhydroxyamine compound represented by the following formula (1) in an amount of 0.01% by mass or more and 5.0% by mass or less based on the total amount of all the monomer components of the resin A:

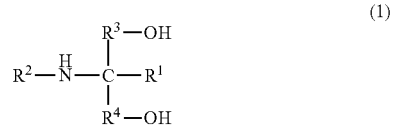

wherein $R^1$ represents a hydrogen atom, an alkyl group having a number of carbon atoms of 1 or more and 5 or less, or a hydroxyalkyl group having a number of carbon atoms of 1 or more and 5 or less; $R^2$ represents a hydrogen atom, an alkyl group having a number of carbon atoms of 1 or more and 6 or less, or a hydroxyalkyl group having a number of carbon atoms of 1 or more and 5 or less; and $R^3$ and $R^4$ each represent an alkanediyl group having a number of carbon atoms of 1 or more and 5 or less, provided that $R^3$ and $R^4$ may be the same as or different from each other.

[2] A binder resin containing a resin A having at least a polyester moiety obtained through polycondensation of an alcohol component, a carboxylic acid component, and a polyhydroxyamine compound represented by the formula (1) in an amount of 0.01% by mass or more and 5.0% by mass or less based on the total amount of all the monomer components of the resin A.

DETAILED DESCRIPTION OF THE INVENTION

When high-speed printing is performed, a problem may occur that a toner remains on a photoreceptor drum, and the toner is attached to a printed matter to cause fog. For the toner for electrophotography described in PTL 1, a further improvement is demanded from the standpoint of the fog suppression capability.

The present invention relates to a toner for electrophotography and a binder resin, exhibiting an excellent fog suppression capability.

It has been found that the fog suppression capability of a toner is enhanced by reacting a particular polyhydroxyamine compound with monomer components of a binder resin of the toner.

The present invention relates to the following items [1] and [2].

[1] A toner for electrophotography containing a resin A having at least a polyester moiety obtained through polycondensation of an alcohol component, a carboxylic acid component, and a polyhydroxyamine compound represented by the following formula (1) in an amount of 0.01% by mass or more and 5.0% by mass or less based on the total amount of all the monomer components of the resin A;

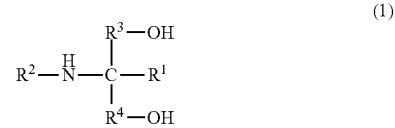

wherein $R^1$ represents a hydrogen atom, an alkyl group having a number of carbon atoms of 1 or more and 5 or less, or a hydroxyalkyl group having a number of carbon atoms of 1 or more and 5 or less; $R^2$ represents a hydrogen atom, an alkyl group having a number of carbon atoms of 1 or more and 6 or less, or a hydroxyalkyl group having a number of carbon atoms of 1 or more and 5 or less; and $R^3$ and $R^4$ each represent an alkanediyl group having a number of carbon atoms of 1 or more and 5 or less, provided that $R^3$ and $R^4$ may be the same as or different from each other.

[2] A binder resin containing a resin A having at least a polyester moiety obtained through polycondensation of an alcohol component, a carboxylic acid component, and a polyhydroxyamine compound represented by the formula (1) in an amount of 0.01% by mass or more and 5.0% by mass or less based on the total amount of all the monomer components of the resin A.

According to the present invention, a toner for electrophotography and a binder resin, exhibiting an excellent fog suppression capability can be provided. According to the present invention, furthermore, a toner for electrophotography and a binder resin, having an excellent odor suppression capability against odors derived from the binder resin and the like can be provided.

[Toner for Electrophotography]

The toner for electrophotography of the present invention contains a resin A having at least a polyester moiety obtained through polycondensation of an alcohol component, a carboxylic acid component, and a polyhydroxyamine compound represented by the following formula (1) in an amount of 0.01% by mass or more and 5.0% by mass or less based on the total amount of all the monomer components of the resin A;

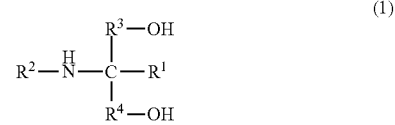

wherein $R^1$ represents a hydrogen atom, an alkyl group having a number of carbon atoms of 1 or more and 5 or less, or a hydroxyalkyl group having a number of carbon atoms of 1 or more and 5 or less; $R^2$ represents a hydrogen atom, an alkyl group having a number of carbon atoms of 1 or more and 6 or less, or a hydroxyalkyl group having a number of carbon atoms of 1 or more and 5 or less; and $R^3$ and $R^4$ each represent an alkanediyl group having a number of carbon atoms of 1 or more and 5 or less, provided that $R^3$ and $R^4$ may be the same as or different from each other.

According to the present invention, a toner for electrophotography exhibiting an excellent fog suppression capability can be provided.

While the reason therefor is not clear, it can be considered that a sharp charge amount distribution is obtained through mutual interaction between the amine group having a positive polarity in the polyhydroxyamine compound and the polyester having a strong negative polarity, and the mutual interaction is strengthened through reaction with the polyester, resulting in a good result for the fog suppression capability.

[Binder Resin]

<Resin A>

The binder resin contains a resin A having at least a polyester moiety obtained through polycondensation of an alcohol component, a carboxylic acid component, and a polyhydroxyamine compound represented by the following formula (1) in an amount of 0.01% by mass or more and 5.0% by mass or less based on the total amount of all the monomer components of the resin A (the resin may be hereinafter referred simply to as a "resin A").

The resin A comprehends a polyester, and a composite resin having a polyester segment.

The resin A is preferably at least one selected from a polyester, and a composite resin having a polyester segment and a styrene resin segment.

[Polyester]

The polyester is preferably obtained through polycondensation of an alcohol component, a carboxylic acid component, and a polyhydroxyamine compound represented by the following formula (1) in an amount of 0.01% by mass or more and 5.0% by mass or less based on the total amount of all the monomer components of the resin A.

(Polyhydroxyamine Compound)

The polyhydroxyamine compound is a compound represented by the following formula (1) from the standpoint of the excellent fog suppression capability and the excellent odor suppression capability.

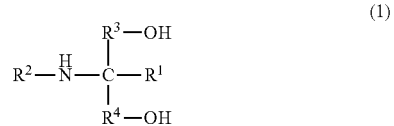

(1)

wherein $R^1$ represents a hydrogen atom, an alkyl group having a number of carbon atoms of 1 or more and 5 or less, or a hydroxyalkyl group having a number of carbon atoms of 1 or more and 5 or less; $R^2$ represents a hydrogen atom, an alkyl group having a number of carbon atoms of 1 or more and 6 or less, or a hydroxyalkyl group having a number of carbon atoms of 1 or more and 5 or less; and $R^3$ and $R^4$ each represent an alkanediyl group having a number of carbon atoms of 1 or more and 5 or less, provided that $R^3$ and $R^4$ may be the same as or different from each other.

The number of carbon atoms of the alkyl group of $R^1$ is preferably 4 or less, more preferably 3 or less, further preferably 2 or less, and still further preferably 1, from the standpoint of providing the excellent fog suppression capability.

The alkyl group of $R^1$ may be any of straight-chain and branched-chain, examples of which include a methyl group, an ethyl group, a n-propyl group, an isopropyl group, various butyl groups, and various pentyl groups, and is preferably at least one selected from a methyl group and an ethyl group, and more preferably a methyl group.

The number of carbon atoms of the hydroxyalkyl group of $R^1$ is preferably 4 or less, more preferably 3 or less, further preferably 2 or less, and still further preferably 1, from the standpoint of providing the excellent fog suppression capability.

Examples of the hydroxyalkyl group of $R^1$ include a hydroxymethyl group, a 2-hydroxyethyl group, a 2-hydroxypropyl group, a 3-hydroxypropyl group, a 2-hydroxybutyl group, a 3-hydroxybutyl group, and a 4-hydroxybutyl group, and the hydroxyalkyl group is preferably at least one selected from a hydroxymethyl group and a 2-hydroxyethyl group, and more preferably a hydroxymethyl group.

Among these, $R^1$ is preferably an alkyl group having a number of carbon atoms of 1 or more and 3 or less or a hydroxyalkyl group having a number of carbon atoms of 1 or more and 3 or less, more preferably at least one selected from a methyl group, an ethyl group, a hydroxymethyl group, and a hydroxyethyl group, and further preferably a hydroxymethyl group.

The number of carbon atoms of the alkyl group of $R^2$ is preferably 3 or less, and more preferably 2 or less, and is preferably 1 or more.

The alkyl group of $R^2$ may be any of straight-chain, branched-chain, and cyclic, examples of which include a methyl group, an ethyl group, a n-propyl group, an isopropyl group, various butyl groups, various pentyl groups, various hexyl groups, a cyclopentyl group, and a cyclohexyl group.

The number of carbon atoms of the hydroxyalkyl group of $R^2$ is preferably 3 or less, and more preferably 2 or less, and is preferably 1 or more. Examples of the hydroxyalkyl group of $R^2$ include the same compounds described above for $R^1$.

Among these, $R^2$ is preferably a hydrogen atom, an alkyl group having a number of carbon atoms of 1 or more and 3 or less, or a hydroxyalkyl group having a number of carbon atoms of 1 or more and 3 or less, more preferably a hydrogen atom.

The number of carbon atoms of the alkanediyl group of $R^3$ and $R^4$ is preferably 4 or less, more preferably 3 or less, further preferably 2 or less, and still further preferably 1.

Examples of the alkanediyl group of $R^3$ and $R^4$ include a methylene group, an ethylene group, a trimethylene group, a propan-1,2-diyl group, and a tetramethylene group, and a methylene group is preferred.

Specific examples of the polyhydroxyamine compound include 2-amino-1,3-propanediol, 2-amino-2-methyl-1,3-propanediol, 2-amino-2-ethyl-1,3-propanediol, 2-amino-2-hydroxymethyl-1,3-propanediol, 2-amino-2-hydroxyethyl-1,3-propanediol, 4-amino-4-hydroxypropyl-1,7-heptanediol, 2-(N-ethyl)amino-1,3-propanediol, 2-(N-ethyl)amino-2-hydroxymethyl-1,3-propanediol, 2-(N-decyl)amino-1,3-propanediol, and 2-(N-decyl)amino-2-hydroxymethyl-1,3-propanediol.

Among these, the polyhydroxyamine compound is preferably at least one selected from 2-amino-2-hydroxymethyl-1,3-propanediol, 2-amino-2-hydroxyethyl-1,3-propanediol, 2-amino-1,3-propanediol, 2-amino-2-methyl-1,3-propanediol, and 2-amino-2-ethyl-1,3-propanediol, more preferably at least one selected from 2-amino-2-hydroxymethyl-1,3-propanediol, 2-amino-2-hydroxyethyl-1,3-propanediol, and 2-amino-2-methyl-1,3-propanediol, and further preferably 2-amino-2-hydroxymethyl-1,3-propanediol, from the standpoint of providing the excellent fog suppression capability.

One kind or two or more kinds of the polyhydroxyamine compound may be used. The polyhydroxyamine compound can be produced by an ordinary method.

The amount of the polyhydroxyamine compound blended is 0.01% by mass or more and 5.0% by mass or less from the standpoint of providing the excellent fog suppression capability, is preferably 0.01% by mass or more, more preferably 0.03% by mass or more, further preferably 0.1% by mass or more, and still further preferably 0.3% by mass or more, and is preferably 4.0% by mass or less, and more preferably 3.0% by mass or less, from the standpoint of providing the fog suppression capability, based on the total amount of all the monomer components of the resin A.

The amount of the polyhydroxyamine compound blended is 0.001% by mass or more and 2.0% by mass or less from the standpoint of providing the excellent fog suppression capability, is preferably 0.01% by mass or more, more preferably 0.10% by mass or more, further preferably 0.20% by mass or more, and still further preferably 0.25% by mass or more, and is preferably 1.0% by mass or less, and more preferably 0.6% by mass or less, from the standpoint of providing the fog suppression capability, based on the total amount of the binder resin.

(Alcohol Component)

The alcohol component may be any of an aromatic polyol compound and an aliphatic polyol compound.

The aromatic polyol compound is preferably an alkylene oxide adduct of bisphenol A, and more preferably an alkylene oxide adduct of bisphenol A represented by the formula (I):

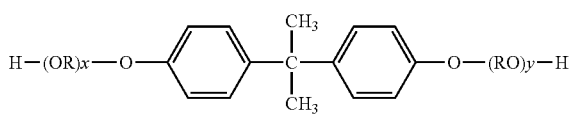

wherein RO and OR each represent an oxyalkylene group, R represents at least one selected from an ethylene group and a propylene group, and x and y each represent an average addition molar number of alkylene oxide, and each are a positive number, provided that the sum of x and y is 1 or more, and preferably 1.5 or more, and is 16 or less, preferably 8 or less, and more preferably 4 or less, from the standpoint of the durability and the fog suppression capability.

Examples of the alkylene oxide adduct of bisphenol A represented by the formula (I) include a propylene oxide adduct of 2,2-bis(4-hydroxyphenyl)propane and an ethylene oxide adduct of 2,2-bis(4-hydroxyphenyl)propane. One kind or two or more kinds of the compound may be used.

The content of the alkylene oxide adduct of bisphenol A represented by the formula (I) is preferably 70% by mol or more, more preferably 90% by mol or more, further preferably 95% by mol or more, and still further preferably 100% by mol, based on the alcohol component.

Examples of the aliphatic polyol compound is preferably an aliphatic diol having a number of carbon atoms of 2 or more and 20 or less and a trihydric or higher hydric aliphatic alcohol, such as glycerin, and among these, an aliphatic diol is preferred.

Examples of the aliphatic diol include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol.

The content of the aliphatic diol is preferably 70% by mol or more, more preferably 90% by mol or more, further preferably 95% by mol or more, and still further preferably 100% by mol, based on the alcohol component.

(Carboxylic Acid Component)

As for the carboxylic acid component, the dibasic carboxylic acid is preferably an aromatic dicarboxylic acid from the standpoint of the storage stability, and is preferably an aliphatic dicarboxylic acid from the standpoint of the low-temperature fusing property.

Examples of the aromatic dicarboxylic acid include phthalic acid, isophthalic acid, terephthalic acid, and an anhydride of these acids or an alkyl (having from 1 to 3 carbon atoms) ester of these acids, and among these, terephthalic acid and isophthalic acid are preferred, and terephthalic acid is more preferred. One kind or two or more kinds thereof may be used. In the present invention, the carboxylic acid component includes not only a free acid but also an anhydride forming an acid through decomposition during reaction and an ester with an alkyl having from 1 to 3 carbon atoms.

The content of the aromatic dicarboxylic acid is preferably 10% by mol or more, more preferably 30% by mol or more, and further preferably 50% by mol or more, and may be 100% by mol or less, based on the carboxylic acid component.

Examples of the aliphatic dicarboxylic acid include an aliphatic dicarboxylic acid, such as oxalic acid, malonic acid, maleic acid, fumaric acid, citraconic acid, itaconic acid, glutaconic acid, succinic acid, adipic acid, and succinic acid substituted with an alkyl group having from 1 to 20 carbon atoms or an alkenyl group having from 2 to 20 carbon atoms, such as dodecenylsuccinic acid and octylsuccinic acid; and anhydrides of these acids and alkyl (having from 1 to 3 carbon atoms) esters of these acids. One kind or two or more kinds thereof may be used.

The content of the aliphatic dicarboxylic acid is preferably 10% by mol or more, and more preferably 20% by mol or more based on the carboxylic acid component, from the standpoint of the low-temperature fusing property, and is preferably 90% by mol or less, and more preferably 80% by mol or less based on the carboxylic acid component, from the standpoint of the fog suppression capability.

The carboxylic acid component preferably contains a tribasic or higher basic carboxylic acid from the standpoint of the productivity.

Examples of the tribasic or higher basic carboxylic acid include 1,2,4-benzenetricarboxylic acid (trimellitic acid), 2,5,7-naphthalenetricarboxylic acid, pyromellitic acid, and anhydrides of these acids and lower alkyl (having from 1 to 3 carbon atoms) esters of these acids, and among these, trimellitic acid and an anhydride thereof are preferred.

The content of the tribasic or higher basic carboxylic acid, preferably the content of trimellitic acid or trimellitic anhydride, is preferably 5% by mol or more, more preferably 10% by mol or more, and further preferably 15% by mol or more, from the standpoint of the productivity, and is preferably 50% by mol or less, more preferably 40% by mol or less, further preferably 35% by mol or less, and still further preferably 30% by mol or less, from the standpoint of the low-temperature fusing property, based on the carboxylic acid component.

A monohydric alcohol may be contained in the alcohol component, and a monobasic carboxylic acid may be contained in the carboxylic acid component, appropriately from the standpoint of the control of the molecular weight.

The equivalent ratio (COOH group/OH group) of the carboxylic acid component and the alcohol component is preferably 0.7 or more, and more preferably 0.8 or more, and is preferably 1.3 or less, more preferably 1.2 or less, and further preferably 1.0 or less, from the standpoint of controlling the end group.

The equivalent ratio (COOH group/OH group) of the carboxylic acid component and the total amount of the polyhydroxyamine compound and the alcohol component is preferably 0.6 or more, and more preferably 0.7 or more, and is preferably 1.3 or less, more preferably 1.2 or less, further preferably 1.0 or less, and still further preferably 0.9 or less, from the standpoint of controlling the end group.

The polycondensation of the polyhydroxyamine compound, the alcohol component, and the carboxylic acid component may be performed, for example, in an inert gas atmosphere, in the presence of an esterification catalyst, a polymerization inhibitor, or the like depending on necessity, at a temperature of approximately 180° C. or more and 250° C. or less. Examples of the esterification catalyst include a tin compound, such as dibutyltin oxide and tin(II) 2-ethylhexanoate, and a titanium compound, such as titanium diisopropylate bistriethanolaminate. Examples of an esterification promoter used with the esterification catalyst include gallic acid. The amount of the esterification catalyst used is preferably 0.01 part by mass or more, and more preferably 0.1 part by mass or more, and is preferably 1 parts by mass or less, and more preferably 0.6 part by mass or less, per 100 parts by mass of the total amount of the polyhydroxyamine compound, the alcohol component, and the carboxylic acid component. The amount of the esterification promoter used is preferably 0.001 part by mass or more, and more preferably 0.01 part by mass or more, and is preferably 0.5 part by mass or less, and more preferably 0.1 part by mass or less, per 100 parts by mass of the total amount of the polyhydroxyamine compound, the alcohol component, and the carboxylic acid component.

[Composite Resin]

The composite resin preferably has a polyester segment and a styrene resin segment.

The polyester segment may be formed of a polyester, and preferred examples of the polyester include the same ones described above for the polyester.

(Styrene Resin Segment)

The styrene resin segment may be formed of a styrene resin, and the styrene resin is preferably obtained through addition polymerization of a raw material monomer containing a styrene compound.

The styrene compound used may be styrene and a styrene derivative, such as α-methylstyrene and vinyltoluene (and in the following description, styrene and a styrene derivative are collectively referred to as a "styrene compound").

The content of the styrene compound is preferably 50% by mass or more, more preferably 60% by mass or more, further preferably 70% by mass or more, and still further preferably 75% by mass or more, from the standpoint of the durability, and is preferably 95% by mass or less, more preferably 90% by mass or less, and further preferably 87% by mass or less, from the standpoint of the low-temperature fusing property, based on the raw material monomer of the styrene resin.

Examples of the raw material monomer of the styrene resin other than the styrene compound include an alkyl (meth)acrylate ester; an ethylenic unsaturated monoolefin compound, such as ethylene and propylene; a diolefin compound, such as butadiene; a halogenated vinyl compound, such as vinyl chloride; a vinyl ester compound, such as vinyl acetate and vinyl propionate; an ethylenic monocarboxylate ester, such as dimethylaminoethyl (meth)acrylate; a vinyl ether compound, such as vinyl methyl ether; a vinylidene halide compound, such as vinylidene chloride; and an N-vinyl compound, such as N-vinylpyrrolidone.

Two or more kinds of the raw material monomer of the styrene resin other than the styrene compound may be used. In the description herein, the "(meth)acrylic acid" means at least one selected from acrylic acid and methacrylic acid.

The raw material monomer of the styrene resin other than the styrene compound is preferably an alkyl (meth)acrylate ester from the standpoint of enhancing the low-temperature fusing property of the toner. The number of carbon atoms of the alkyl group in the alkyl (meth)acrylate ester is preferably 1 or more, more preferably 2 or more, and further preferably 3 or more, and is preferably 22 or less, more preferably 18 or less, further preferably 12 or less, and still further preferably 8 or less, from the aforementioned standpoint. The number of carbon atoms of the alkyl ester means the number of carbon atoms derived from the alcohol component constituting the ester.

Specific examples of the alkyl (meth)acrylate ester include methyl (meth)acrylate, ethyl (meth)acrylate, (iso)propyl (meth)acrylate, 2-hydroxyethyl (meth)acrylate, (iso- or tert-)butyl (meth)acrylate, 2-ethylhexyl (meth)acrylate, (iso)octyl (meth)acrylate, (iso)decyl (meth)acrylate, and (iso)stearyl (meth)acrylate. The expressions "(iso- or tert-)" and "(iso)" herein each mean that both the case where the prefix exists and the case where the prefix does not exist are included, and the case where the prefix does not exist shows the normal. The "(meth)acrylate" means that both the cases of an acrylate and a methacrylate are included.

The content of the alkyl (meth)acrylate ester is preferably 5% by mass or more, more preferably 10% by mass or more, and further preferably 13% by mass or more, from the standpoint of the low-temperature fusing property, and is preferably 50% by mass or less, more preferably 40% by mass or less, further preferably 30% by mass or less, and still further preferably 25% by mass or less, from the same standpoint, based on the raw material monomer of the styrene resin segment.

The resin obtained through addition polymerization of the raw material monomer containing the styrene compound and the alkyl (meth)acrylate ester may also be referred to as a styrene-(meth)acrylate resin.

The addition polymerization reaction of the raw material monomer of the styrene resin may be performed, for example, by an ordinary method in the presence of a polymerization initiator, such as dibutyl peroxide and dicumyl peroxide, a crosslinking agent, and the like, in the presence of an organic solvent or without a solvent, and the temperature condition is preferably 110° C. or more, more preferably 120° C. or more, and further preferably 130° C. or more, and is preferably 250° C. or less, more preferably 200° C. or less, and further preferably 170° C. or less.

In the case where an organic solvent is used in the addition polymerization reaction, xylene, toluene, methyl ethyl ketone, acetone, and the like may be used. The amount of the organic solvent used is preferably approximately 10 parts by mass or more and approximately 50 parts by mass or less per 100 parts by mass of the raw material monomer of the styrene resin.

(Bireactive Monomer)

The composite resin is preferably a composite resin that is obtained by further using a bireactive monomer capable of reacting with both the raw material monomer of the polyester segment and the raw material monomer of the styrene resin segment, in addition to the raw material monomer of the polyester segment and the raw material monomer of the styrene resin segment, from the standpoint of enhancing the durability and the low-temperature fusing property of the toner. Accordingly, in the production of the composite resin through polymerization of the raw material monomer of the polyester segment and the raw material monomer of the styrene resin segment, the polycondensation reaction and/or the addition polymerization reaction are preferably performed in the presence of the bireactive monomer. According to the procedure, the composite resin becomes such a composite resin that the polyester segment and the styrene resin segment are bonded to each other through the constitutional unit derived from the bireactive monomer, and the polyester segment and the styrene resin segment are dispersed finely and uniformly.

Accordingly, the composite resin is preferably a resin obtained through polymerization of (i) the raw material monomer of the polyester segment containing an alcohol component containing the alkylene oxide adduct of bisphenol A represented by the formula (I), and a carboxylic acid component containing an aromatic dicarboxylic acid, (ii) the raw material monomer of the styrene resin segment, and (iii) the bireactive monomer capable of reacting with both the raw material monomer of the polyester segment and the raw material monomer of the styrene resin segment.

The bireactive monomer is preferably a compound that has in the molecule thereof at least one functional group selected from a hydroxyl group, a carboxyl group, an epoxy group, a primary amino group, and a secondary amino group, preferably at least one functional group selected from a hydroxyl group and a carboxyl group, and more preferably a carboxyl group and an ethylenic unsaturated bond, and the use of the bireactive monomer may enhance the dispersibility of the resin as the dispersed state. The bireactive monomer is preferably at least one selected from acrylic acid, methacrylic acid, fumaric acid, maleic acid, and maleic anhydride, and is more preferably acrylic acid, methacrylic acid, or fumaric acid, and further preferably acrylic acid or methacrylic acid, from the standpoint of the reactivity of the polycondensation reaction and the addition polymerization reaction. In the use thereof with a polymerization inhibitor, a polybasic carboxylic acid having an ethylenic unsaturated bond, such as fumaric acid, functions as a raw material monomer of the polyester segment. In this case, fumaric acid or the like is not the bireactive monomer but is a raw material monomer of the polyester segment.

The amount of the bireactive monomer used is preferably 1 mole or more, more preferably 2 moles or more, and further preferably 3 moles or more, from the standpoint of the low-temperature fusing property, and is preferably 20 moles or less, more preferably 10 moles or less, and further preferably 7 moles or less, from the standpoint of the durability of the toner, per 100 moles in total of the alcohol component of the polyester segment.

The mass ratio (polyester segment/styrene resin segment) of the polyester segment and the styrene resin segment in the composite resin is preferably 60/40 or more, more preferably 70/30 or more, and further preferably 75/25 or more, from the standpoint of the low-temperature fusing property, and is preferably 95/5 or less, more preferably 90/10 or less, and further preferably 85/15 or less, from the standpoint of the durability. In the aforementioned calculation, the mass of the polyester segment is the amount obtained by subtracting the amount (calculated amount) of water eliminated in the polycondensation reaction from the mass of the raw material monomer of the polycondensation resin used, and the amount of the bireactive monomer is included in the amount of the raw material monomer of the polyester segment. The amount of the styrene resin segment is the amount of the raw material monomer of the styrene resin segment, and the amount of the polymerization initiator is included in the amount of the raw material monomer of the styrene resin segment.

The softening point of the resin A is preferably 90° C. or more, more preferably 95° C. or more, and further preferably 100° C. or more, from the standpoint of enhancing the durability and the hot offset resistance, and is preferably 150° C. or less, more preferably 145° C. or less, further preferably 140° C. or less, still further preferably 130° C. or less, still more further preferably 120° C. or less, and still more further preferably 110° C. or less, from the standpoint of enhancing the low-temperature fusing property of the toner.

The glass transition temperature of the resin A is preferably 45° C. or more, more preferably 50° C. or more, and further preferably 55° C. or more, from the standpoint of enhancing the durability and the storage stability, and is preferably 80° C. or less, more preferably 75° C. or less, further preferably 70° C. or less, and still further preferably 65° C. or less, from the standpoint of enhancing the low-temperature fusing property of the toner.

The acid value of the resin A is preferably 40 mgKOH/g or less, more preferably 30 mgKOH/g or less, and further preferably 20 mgKOH/g or less, and is preferably 1 mgKOH/g or more, and more preferably 2 mgKOH/g or more, from the standpoint of enhancing the environmental stability of the charge amount of the toner.

The number average molecular weight of the binder resin is preferably 1,000 or more, more preferably 1,500 or more, and further preferably 3,000 or more, and is preferably 7,000 or less, more preferably 6,000 or less, further preferably 5,500 or less, still further preferably 4,000 or less, and still more further preferably 3,000 or less, from the standpoint of the durability and the storage stability.

The measurement methods of the softening point, the glass transition temperature, the acid value, and the number average molecular weight are the methods described in the examples. In the case where two or more kinds of resins are contained, the softening point, the glass transition temperature, the acid value, and the number average molecular weight are preferably such values that the weighted average values thereof are in the aforementioned ranges respectively.

The binder resin contained in the toner of the present invention contains at least a constitutional component derived from the aforementioned polyhydroxyamine compound, and preferably further contains an additional polyester.

Examples of the additional polyester include a polyester obtained through polycondensation of the alcohol component and the carboxylic acid component that are exemplified for the aforementioned polyester.

The total content of the resin A is preferably 3% by mass or more, more preferably 10% by mass or more, and further preferably 20% by mass or more, and is preferably 98% by mass or less, more preferably 70% by mass or less, further preferably 55% by mass or less, still further preferably 40% by mass or less, and still more further preferably 35% by mass or less, based on the binder resin.

<Resins H and L>

In the aforementioned resins, the toner of the present invention preferably contains two kinds of resins having softening points that are different from each other by 20° C. or more from the standpoint of the high-temperature offset resistance and the low-temperature fusing property. Specifically, the toner preferably contains an amorphous resin H and an amorphous resin L having a softening point that is lower by 20° C. or more than the amorphous resin H.

The softening point of the resin H having a higher softening point is preferably 170° C. or less, and more preferably 160° C. or less, from the standpoint of the low-temperature fusing property, and is preferably 110° C. or more, more preferably 120° C. or more, and further preferably 130° C. or more, from the standpoint of the high-temperature offset resistance.

The softening point of the resin L having a lower softening point is preferably 80° C. or more, and more preferably 95° C. or more, from the standpoint of the durability, and is preferably 125° C. or less, and more preferably 115° C. or less, from the standpoint of the low-temperature fusing property.

The difference in softening point between the resin H and the resin L is preferably 10° C. or more, more preferably 20° C. or more, and further preferably 25° C. or more, and is preferably 60° C. or less, more preferably 50° C. or less, and further preferably 40° C. or less, from the standpoint of the high-temperature offset resistance and the low-temperature fusing property.

The mass ratio (resin H/resin L) of the resin H and the resin L is preferably 20/80 or more, more preferably 40/60 or more, further preferably 50/50 or more, and still further preferably 60/40 or more, from the standpoint of the durability and the productivity, and is preferably 90/10 or less, more preferably 80/20 or less, and further preferably 75/25 or less, from the standpoint of the low-temperature fusing property.

The total content of the resin H and the resin L is preferably 80% by mass or more, more preferably 85% by mass or more, and further preferably 92% by mass or more, and is preferably 100% by mass or less, more preferably 99% by mass or less, further preferably 98% by mass or less, and still further preferably 97% by mass or less, based on the binder resin.

The resin H and the resin L each are preferably an amorphous resin.

In the present invention, the "amorphous resin" means a resin that has a value of a crystallinity index, which is defined by the ratio of the softening point (° C.) with respect to the highest endothermic peak temperature (° C.) with a differential scanning calorimeter (DSC), i.e., ((softening point)/(highest endothermic peak temperature)), of 1.4 or more or less than 0.6. The highest endothermic peak temperature means the temperature of the peak that has the highest temperature among the endothermic peaks observed under the condition of the measurement method described in the examples.

In the case where the resin H and the resin L each are an amorphous resin, the amorphous resin is preferably a resin containing an aromatic polyol as the alcohol component among the aforementioned resins. The preferred examples of the aromatic polyol compound and the other preferred examples are the same as the examples described above.

<Resin C>

In the aforementioned resins, the toner for electrophotography of the present invention preferably contains a crystalline resin C (which may be hereinafter referred simply to as a "resin C").

The "crystalline resin" means a resin that has a value of the aforementioned crystallinity index of 0.6 or more and less than 1.4, and preferably 0.8 or more and 1.2 or less.

The crystalline resin C is preferably a polyester containing an aliphatic polyol as the alcohol component among the aforementioned resins. The preferred examples of the aliphatic polyol compound and the preferred examples of the other components are the same as the examples described above.

The softening point of the resin C is preferably 100° C. or less, and more preferably 90° C. or less, from the standpoint of the low-temperature fusing property, and is preferably 60° C. or more, more preferably 70° C. or more, and further preferably 80° C. or more, from the standpoint of the high-temperature offset resistance.

The melting point of the resin C is preferably 100° C. or less, and more preferably 90° C. or less, from the standpoint of the low-temperature fusing property, and is preferably 60° C. or more, more preferably 70° C. or more, and further preferably 80° C. or more, from the standpoint of the high-temperature offset resistance.

The content of the resin C is preferably 1% by mass or more, more preferably 2% by mass or more, and further preferably 3% by mass or more, and is preferably 20% by mass or less, more preferably 15% by mass or less, and further preferably 8% by mass or less, based on the binder resin.

Among the above, the binder resin
preferably (i) contains an amorphous resin and a crystalline resin, in which at least one selected from the amorphous resin and the crystalline resin is the aforementioned resin A, and more preferably (ii) contains the amorphous resin H, the amorphous resin L, and the crystalline resin C, in which at least one selected from the amorphous resin L and the crystalline resin C is the aforementioned resin A, from the standpoint of providing the excellent fog suppression capability and the excellent odor suppression capability.

The total content of the polyester resin is preferably 80% by mass or more, more preferably 90% by mass or more, and further preferably 95% by mass or more, and is preferably 100% by mass or less, based on the binder resin.

<Charge Controlling Agent>

The toner for electrophotography of the present invention preferably contains a charge controlling agent.

The charge controlling agent is not particularly limited, and any of a positive charge controlling agent and a negative charge controlling agent may be contained.

Examples of the positive charge controlling agent include a nigrosine dye, such as "Nigrosine Base EX", "Oil Black BS", "Oil Black SO", "Bontron N-01", "Bontron N-04", "Bontron N-07", "Bontron N-09", and "Bontron N-11" (all produced by Orient Chemical Industries, Co., Ltd.); a triphenylmethane dye having a tertiary amine as a side chain, a quaternary ammonium salt compound, such as "Bontron P-51" (produced by Orient Chemical Industries, Co., Ltd.), cetyltrimethylammonium bromide, "Copy Charge PX VP435" (produced by Clariant AG); a polyamine resin, such as "AFP-B" (produced by Orient Chemical Industries, Co., Ltd.); an imidazole derivative, such as "PLZ-2001" and "PLZ-8001" (all produced by Shikoku Chemicals Corporation); and a styrene-acrylic resin, such as "FCA-701PT" (produced by Fujikura Kasei Co., Ltd.).

Examples of the negative charge controlling agent include a metal-containing azo dye, such as "Valifast Black 3804", "Bontron S-31", "Bontron S-32", "Bontron S-34", and "Bontron S-36" (all produced by Orient Chemical Industries, Co., Ltd.), and "Aizen Spilon Black THE" and "T-77" (all produced by Hodogaya Chemical Co., Ltd.); a metal compound of a benzilic acid, such as "LR-147" and "LR-297" (all produced by Japan Carlit Co., Ltd.), a metal compound of a salicylic acid compound, such as "Bontron E-81", "Bontron E-84", "Bontron E-88", and "Bontron E-304" (all produced by Orient Chemical Industries, Co., Ltd.), and "TN-105" (produced by Hodogaya Chemical Co., Ltd.); a copper phthalocyanine dye; a quaternary ammonium salt, such as "Copy Charge NX VP434" (produced by Clariant AG), a nitroimidazole derivative; and an organic metal compound.

Among the charge controlling agents, a negative charge controlling agent is preferred, and a metal compound of a benzilic acid compound and a metal compound of a salicylic acid compound are more preferred.

The content of the charge controlling agent is preferably 0.01 part by mass or more, and more preferably 0.2 part by mass or more, from the standpoint of the fog suppression capability of the toner, and is preferably 10 parts by mass or less, more preferably 5 parts by mass or less, further preferably 3 parts by mass or less, and still further preferably 2 parts by mass or less, from the same standpoint, per 100 parts by mass of the binder resin.

The toner for electrophotography of the present invention may contain a colorant.

The colorant may be any of dyes, pigments, and the like that have been used as a colorant for a toner, and examples thereof include carbon black, phthalocyanine blue, permanent brown FG, brilliant fast scarlet, pigment green B, rhodamine-B base, solvent red 49, solvent red 146, solvent blue 35, quinacridone, carmine 6B, and disazo yellow. The toner of the present invention may be any of a black toner and a color toner.

The content of the colorant is preferably 1 part by mass or more, and more preferably 2 parts by mass or more, and is preferably 40 parts by mass or less, more preferably 20 parts by mass or less, and further preferably 10 parts by mass or less, per 100 parts by mass of the binder resin, from the standpoint of enhancing the image density of the toner.

<Release Agent>

The toner for electrophotography of the present invention may contain a release agent.

Examples of the release agent include polypropylene wax, polyethylene wax, and polypropylene-polyethylene copolymer wax; hydrocarbon wax, such as microcrystalline wax, paraffin wax, Fischer-Tropsch wax, and Sasol wax, and oxides thereof; ester wax, such as carnauba wax and montan wax, and deoxidized wax thereof, and fatty acid ester wax; a fatty acid amide compound, a fatty acid compound, a higher alcohol compound, and a fatty acid metal salt, and one kind or two or more kinds thereof may be used.

The melting point of the release agent is preferably 60° C. or more, and more preferably 70° C. or more, from the standpoint of the transferability of the toner, and is preferably 160° C. or less, and more preferably 150° C. or less, and further preferably 140° C. or less, from the standpoint of the low-temperature fusing property.

The content of the release agent is preferably 0.5 part by mass or more, more preferably 1.0 part by mass or more, and further preferably 1.5 parts by mass or more, from the standpoint of the low-temperature fusing property and the offset resistance of the toner, and is preferably 10 parts by mass or less, more preferably 8 parts by mass or less, and further preferably 7 parts by mass or less, from the standpoint of the dispersibility in the binder resin, per 100 parts by mass of the binder resin.

The raw material of the toner for electrophotography may further contain additives, such as magnetic powder, a fluidity enhancer, a conductivity controlling agent, a reinforcing filler, such as a fibrous substance, an antioxidant, an anti-aging agent, and a cleaning property enhancer.

The volume median diameter ($D_{50}$) of the toner for electrophotography of the present invention is preferably 2 μm or more, more preferably 3 μm or more, and further preferably 4 μm or more, and is preferably 20 μm or less, more preferably 15 μm or less, and further preferably 10 μm or less.

[Method for Producing Toner for Electrophotography]

Examples of the method for producing a toner for electrophotography of the present invention include:

(1) a method including melt-kneading a toner raw material mixture containing the binder resin of the present invention; and pulverizing a resulting melt-kneaded material, thereby producing a toner, (2) a method including aggregating and fusing the binder resin particles in a toner raw material mixture containing a dispersion liquid having the binder resin of the present invention dispersed in an aqueous dispersion medium, so as to provide toner particles, thereby producing a toner, and (3) a method including high-speed agitating a dispersion liquid having the binder resin of the present invention dispersed in an aqueous medium, and a toner raw material, so as to provide toner particles, thereby producing a toner.

The melt-kneading method (1) is preferred form the standpoint of enhancing the productivity of the toner and the standpoint of enhancing the fusing property of the toner. The toner may also be obtained by the aggregation and fusion method (2). The polyhydroxyamine compound may be further added in any of the steps, in such a range that does not impair the effects of the present invention.

In the production of the toner by any of the aforementioned methods, the amount of the binder resin used is preferably 5% by mass or more, more preferably 30% by mass or more, further preferably 50% by mass or more, still further preferably 70% by mass or more, still more further preferably 80% by mass or more, and still more further preferably 90% by mass or more, and is preferably 100% by mass or less, and more preferably 99% by mass or less, based on the toner, from the standpoint of enhancing the storage stability of the toner and the fusing property of the toner.

(1) Method of melt-kneading toner raw material mixture containing binder resin, and pulverizing resulting melt-kneaded material to provide toner (melt-kneading method)

The method (1) preferably includes the following steps 1 and 2:

step 1: a step of melt-kneading a toner raw material mixture containing the binder resin of the present invention, and step 2: a step of pulverizing and classifying the melt-kneaded material obtained in the step 1.

In the step 1, it is more preferred that a colorant is melt-kneaded, and it is preferred that additional additives, such as a release agent and a charge controlling agent, are also melt-kneaded. The polyhydroxyamine compound may also be further added in the melt kneading in such a range that does not impair the effects of the present invention.

The melt kneading may be performed with a known kneader, such as a closed kneader, a single screw or twin screw extruder, and an open roll kneader. An open roll kneader is preferably used since the additives, such as the colorant, the charge controlling agent, and the release agent, can be highly dispersed in the toner with high efficiency even without the use of repetition of kneading or the use of a dispersion assistant, and the open roll kneader is preferably equipped with a feeding port and a kneaded material discharging port along the axial direction of the roll.

It is preferred that the toner raw materials including the binder resin, the colorant, the charge controlling agent, the release agent, and the like are mixed with a mixer, such as a Henschel mixer and a ball mill, in advance, and then supplied to the kneader.

The open roll kneader has a kneading part that is not closed but is open, and the kneading heat generated on kneading can be readily radiated. A continuous open roll kneader is preferably a kneader that is equipped with at least two rolls, and the continuous open roll kneader used in the present invention is a kneader that is equipped with two rolls different in circumferential velocity, i.e., two rolls including a high-rotation roll having a large circumferential velocity and a low-rotation roll having a small circumferential velocity. In the present invention, it is preferred that the high-rotation roll is a heating roll, and the low-rotation roll is a cooling roll, from the standpoint of enhancing the dispersibility of the colorant, the charge controlling agent, the releasing agent, and the like in the toner, the standpoint of decreasing the mechanical force on melt-kneading to suppress the heat generation, and the standpoint of decreasing the temperature on melt-kneading.

The temperature of the roll can be controlled, for example, by the temperature of the heat medium passing through the interior of the roll.

The heating temperature in the roll is preferably 20° C. or more, and more preferably 30° C. or more, and is preferably 150° C. or less, and more preferably 130° C. or less, from the standpoint of the dispersibility of the additives.

The circumferential velocity of rotation of the rolls for a co-rotation twin screw extruder is preferably 5 m/min or more, more preferably 10 m/min or more, and further preferably 20 m/min or more, and is preferably 50 m/min or less, more preferably 40 m/min or less, and further preferably 30 m/min or less, from the standpoint of enhancing the dispersibility of the colorant, the charge controlling agent, the release agent, and the like in the toner, and the standpoint of decreasing the mechanical force on melt-kneading to suppress the heat generation.

The circumferential velocity of the high-rotation roll is preferably 2 m/min or more, more preferably 10 m/min or more, and further preferably 25 m/min or more, and is preferably 100 m/min or less, more preferably 75 m/min or less, and further preferably 50 m/min or less, from the standpoint of enhancing the dispersibility of the colorant, the charge controlling agent, the release agent, and the like in the toner, the standpoint of decreasing the mechanical force on melt-kneading to suppress the heat generation, and the standpoint of enhancing the durability and the low-temperature fusing property of the toner.

The circumferential velocity of the low-rotation roll is preferably 1 m/min or more, more preferably 5 m/min or more, and further preferably 15 m/min or more, and is preferably 90 m/min or less, more preferably 60 m/min or less, and further preferably 30 m/min or less, from the same standpoint. The ratio of the circumferential velocities of the two rolls (low-rotation roll/high-rotation roll) is preferably from 1/10 to 9/10, and more preferably from 3/10 to 8/10.

The rolls are not particularly limited in structure, size, material, and the like, and the surfaces of the rolls may be any of a flat surface, a waved surface, an uneven surface, and the like, and preferably have plural spiral grooves formed thereon from the standpoint of increasing the kneading shear force to enhance the dispersibility of the colorant, the charge controlling agent, the release agent, and the like in the toner, and the standpoint of decreasing the mechanical force on melt-kneading to suppress the heat generation.

The melt-kneaded material obtained in the step 1 is cooled to such an extent that the material can be pulverized, and then supplied to the step 2.

In the step 2, the melt-kneaded material obtained in the step 1 is pulverized and classified.

The pulverizing step may be performed in multiple stages. For example, the resin kneaded material obtained by curing the melt-kneaded material may be coarsely pulverized to a size of approximately from 1 to 5 mm, and the finely pulverized to the target particle diameter.

The pulverizer used in the pulverizing step is not particularly limited, and examples of the pulverizer that may be preferably used for coarse pulverization include a hummer mill, an atomizer, and Rotoplex. Examples of the pulverizer that may be preferably used for fine pulverization include a fluidized bed jet mill, a collision plate jet mill, and a rotary mechanical mill. From the standpoint of the pulverization efficiency, a fluidized bed jet mill and a collision plate jet mill are preferably used, and a fluidized bed jet mill is more preferably used.

Examples of the classifier used for the classifying step include a rotor classifier, an airflow classifier, an inertial classifier, and a sieve classifier. The pulverized product that is removed in the classifying step due to the insufficient pulverization may be again supplied to the pulverizing step, and the pulverizing step and the classifying step may be repeated depending on necessity.

The method (1) may further include the following step 3:

step 3: mixing the powder obtained through classification with an external additive.

Examples of the external additive include inorganic fine particles, such as hydrophobic silica, titanium oxide fine particles, alumina fine particles, cerium oxide fine particles, and carbon black, and polymer fine particles, such as polycarbonate, polymethyl methacrylate, and a silicone resin, and among these, hydrophobic silica is preferred.

In the case where the toner particles are subjected to a surface treatment with an external additive, the amount of the external additive added is preferably 0.1 part by mass or more, more preferably 0.5 part by mass or more, and further preferably 1.0 part by mass or more, and is preferably 5 parts by mass or less, more preferably 4 parts by mass or less, and further preferably 3 parts by mass or less, per 100 parts by mass of the toner particles.

In relation to the aforementioned embodiments, the present invention further relates to the toners for electrophotography, and the like shown below.

<1> A toner for electrophotography containing a resin A having at least a polyester moiety obtained through polycondensation of an alcohol component, a carboxylic acid component, and a polyhydroxyamine compound represented by the following formula (1) in an amount of 0.01% by mass or more and 5.0% by mass or less based on the total amount of all the monomer components of the resin A;

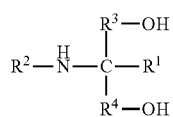

wherein $R^1$ represents a hydrogen atom, an alkyl group having a number of carbon atoms of 1 or more and 5 or less, or a hydroxyalkyl group having a number of carbon atoms of 1 or more and 5 or less; $R^2$ represents a hydrogen atom, an alkyl group having a number of carbon atoms of 1 or more and 6 or less, or a hydroxyalkyl group having a number of carbon atoms of 1 or more and 5 or less; and $R^3$ and $R^4$ each represent an alkanediyl group having a number of carbon atoms of 1 or more and 5 or less, provided that $R^3$ and $R^4$ may be the same as or different from each other.

<2> The toner for electrophotography according to the item <1>, wherein the polyhydroxyamine compound is at least one selected from 2-amino-1,3-propanediol, 2-amino-2-methyl-1,3-propanediol, 2-amino-2-ethyl-1,3-propanediol, 2-amino-2-hydroxymethyl-1,3-propanediol, and 2-amino-2-hydroxyethyl-1,3-propanediol.

<3> The toner for electrophotography according to the item <1> or <2>, wherein the polyhydroxyamine compound is 2-amino-2-hydroxymethyl-1,3-propanediol.

<4> The toner for electrophotography according to any one of the items <1> to <3>, wherein the amount of the polyhydroxyamine compound blended is 0.01% by mass or more, preferably 0.01% by mass or more, more preferably 0.03% by mass or more, further preferably 0.1% by mass or more, and still further preferably 0.3% by mass or more, and is 5.0% by mass or less, preferably 4.0% by mass or less, and more preferably 3.0% by mass or less, based on the total amount of all the monomer components of the resin A.

<5> The toner for electrophotography according to any one of the items <1> to <4>, wherein the toner contains an amorphous resin and a crystalline resin, and
at least one selected from the amorphous resin and the crystalline resin is the resin A.

<6> The toner for electrophotography according to any one of the items <1> to <5>, wherein the toner contains an amorphous resin H, an amorphous resin L having a softening point that is lower by 20° C. or more than the amorphous resin H, and a crystalline resin C, and
at least one selected from the amorphous resin L and the crystalline resin C is the resin A.

<7> The toner for electrophotography according to any one of the items <1> to <6>, wherein the softening point of the resin A is 90° C. or more, preferably 95° C. or more, and more preferably 100° C. or more, and is 150° C. or less, preferably 145° C. or less, more preferably 140° C. or less, further preferably 130° C. or less, still further preferably 120° C. or less, and still more further preferably 110° C. or less.

<8> The toner for electrophotography according to any one of the items <1> to <7>, wherein the glass transition temperature of the resin A is 45° C. or more, preferably 50° C. or more, and more preferably 55° C. or more, and is 80° C. or less, preferably 75° C. or less, more preferably 70° C. or less, and further preferably 65° C. or less.

<9> The toner for electrophotography according to any one of the items <1> to <8>, wherein the acid value of the resin A is 40 mgKOH/g or less, preferably 30 mgKOH/g or less, and more preferably 20 mgKOH/g or less, and is 1 mgKOH/g or more, and preferably 2 mgKOH/g or more.

<10> The toner for electrophotography according to any one of the items <1> to <9>, wherein the resin A is at least one selected from a polyester, and a composite resin having a polyester segment and a styrene resin segment.

<11> The toner for electrophotography according to any one of the items <1> to <10>, wherein the composite resin is a resin obtained through polymerization of (i) a raw material monomer of a polyester segment containing an alcohol component containing an alkylene oxide adduct of bisphenol A, and a carboxylic acid component containing an aromatic dicarboxylic acid, (ii) a raw material monomer of a styrene resin segment, and (iii) a bireactive monomer capable of reacting with both the raw material monomer of the polyester segment and the raw material monomer of the styrene resin segment.

<12> The toner for electrophotography according to any one of the items <1> to <11>, wherein the bireactive monomer is preferably a compound that has in the molecule thereof at least one functional group selected from a hydroxyl group, a carboxyl group, an epoxy group, a primary amino group, and a secondary amino group, preferably at least one functional group selected from a hydroxyl group and a carboxyl group, and more preferably a carboxyl group and an ethylenic unsaturated bond, and is further preferably at least one selected from acrylic acid, methacrylic acid, fumaric acid, maleic acid, and maleic anhydride.

<13> A binder resin containing a resin A having at least a polyester moiety obtained through polycondensation of an alcohol component, a carboxylic acid component, and a polyhydroxyamine compound represented by the formula (1) in an amount of 0.01% by mass or more and 5.0% by mass or less based on the total amount of all the monomer components of the resin A;

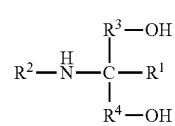

wherein $R^1$ represents a hydrogen atom, an alkyl group having a number of carbon atoms of 1 or more and 5 or less, or a hydroxyalkyl group having a number of carbon atoms of 1 or more and 5 or less; $R^2$ represents a hydrogen atom, an alkyl group having a number of carbon atoms of 1 or more and 6 or less, or a hydroxyalkyl group having a number of carbon atoms of 1 or more and 5 or less; and $R^3$ and $R^4$ each represent an alkanediyl group having a number of carbon atoms of 1 or more and 5 or less, provided that $R^3$ and $R^4$ may be the same as or different from each other.

EXAMPLES

The property values of the resins and the like were measured and evaluated in the following manners.
[Acid Value of Resin]
The acid value of the resin was measured according to the method of JIS K0070, provided that only the measurement solvent was changed from a mixed solvent of ethanol and ether defined in JIS K0070 to a mixed solvent of acetone and toluene (acetone/toluene=1/1 (volume ratio)).
[Softening Point and Glass Transition Temperature of Resin]
(1) Softening Point
By using a flow tester, "CFT-500D" (produced by Shimadzu Corporation), 1 g of a specimen was extruded through a nozzle having a diameter of 1 mm and a length of 1 mm under application of a load of 1.96 MPa thereto with a plunger while heating the specimen at a temperature rising rate of 6° C./min. The descent amount of the plunger of the flow tester was plotted with respect to the temperature, and the temperature, at which a half amount of the specimen flowed out, was designated as the softening point.

(2) Maximum Endothermic Peak Temperature of Resin

By using a differential scanning calorimeter, "Q-100" (produced by TA Instruments Japan Inc.), a specimen was cooled from room temperature (20° C.) to 0° C. at a temperature decreasing rate of 10° C./min and held for 1 minute. Thereafter, the specimen was measured while heating to 180° C. at a temperature rising rate of 10° C./min. The temperature of the peak that had the highest temperature among the endothermic peaks observed was designated as the maximum endothermic peak temperature.

(3) Glass Transition Temperature

By using a differential scanning calorimeter, "Q-100" (produced by TA Instruments Japan Inc.), from 0.01 to 0.02 g of a specimen weighed on an aluminum pan was heated to 200° C. and then cooled from that temperature to 0° C. at a temperature decreasing rate of 10° C./min. The specimen was then measured while heating to 150° C. at a temperature rising rate of 10° C./min and measured. The intersection point of the extended line of the base line below the maximum endothermic peak temperature and the tangential line showing the maximum gradient between the rising part of the peak and the apex of the peak was designated as the glass transition temperature.

(4) Number Average Molecular Weight and Weight Average Molecular Weight of Resin The molecular weight distribution was measured by the gel permeation chromatography (GPC) method according to the following manner, from which the number average molecular weight Mn and the weight average molecular weight Mw of the resin were obtained.

(4-1) Preparation of Specimen Solution

The resin was dissolved in chloroform to make a concentration of 0.5 g/100 mL. The solution was filtered with a fluorine resin filter having a pore size of 2 μm ("FP-200", a trade name, produced by Sumitomo Electric Industries, Ltd.) to remove insoluble components, and thus a specimen solution was prepared.

(4-2) Measurement of Molecular Weight

In the device shown below, chloroform as an eluent was flowed through a flow rate of 1 mL/min, and the column was stabilized in a thermostat chamber at 40° C. 100 μL of the specimen solution was injected thereto and measured. The molecular weight of the specimen was calculated based on the calibration line having been prepared in advance. The calibration line used herein was prepared by using the monodisperse polystyrene samples ($2.63 \times 10^3$, $2.06 \times 10^4$, and $1.02 \times 10^5$, produced by Tosoh Corporation, and $2.10 \times 10^3$, $7.00 \times 10^3$, and $5.04 \times 10^4$, produced by GL Sciences, Inc.) as the standard sample.

Measuring device: "CO-8010" (produced by Tosoh Corporation)

Analysis columns: "GMH$_{XL}$" and "G3000H$_{XL}$" (all produced by Tosoh Corporation)

[Volume Median Particle Diameter ($D_{50}$) of Toner]

The volume median particle diameter ($D_{50}$) of the toner was measured in the following manner.

Measuring device: Coulter Multisizer II (produced by Beckman Coulter Inc.)

Aperture diameter: 50 μm

Analysis software: Coulter Multisizer AccuComp, ver. 1.19 (produced by Beckman Coulter Inc.)

Electrolytic solution: Isoton II (produced by Beckman Coulter Inc.)

Dispersion liquid: Emulgen 109P (produced by Kao Corporation, polyoxyethylene lauryl ether, HLB: 13.6) 5% electrolytic solution Dispersion condition: 10 mg of a measurement specimen was added to 5 mL of the dispersion liquid and dispersed with an ultrasonic dispersing device for 1 minute, and 25 mL of the electrolytic solution was then further added thereto and dispersed with an ultrasonic dispersing device for 1 minute.

Measurement condition: 100 mL of the electrolytic solution and the dispersion liquid were placed in a beaker, 30,000 particles were measured under a concentration capable of measuring 30,000 particles within 20 seconds, and the volume median particle diameter ($D_{50}$) was obtained from the particle size distribution.

[Evaluation: Fog ΔE]

The toner was installed in a non-magnetic one-component developing device "MicroLine 5400" (produced by Oki Data Corporation), and after allowing to stand in an environment of a temperature of 25° C. and a relative humidity of 50% for 12 hours, printed for a blank sheet (0%). Thereafter, the toner remaining on the photoreceptor drum was transferred with a mending adhesive tape, and measured for the difference in image density ΔE from the reference with a colorimeter "X-Rite" (produced by X-Rite, Inc.), thereby evaluating the fog. The ΔE is preferably less than 2.0. The results are shown in the table.

[Evaluation: Odor Suppression Capability]

5 g of the toner obtained in Example or Comparative Example was heated on a hot plate at 200° C. for 5 minutes, and the odor thereof was evaluated by 10 persons with ranks 1 to 4 (1: extremely offensive odor, 2: offensive odor, 3: substantially no odor, 4: no odor). The average values of the evaluation results of the 10 persons are shown in the table.

Production Examples of Resin

Production Example H21 (Resin H-21)

The raw material monomers of a polyester resin except for fumaric acid and trimellitic anhydride, the esterification catalyst, and the promotor shown in Table 1 were placed in a four-neck flask having a capacity of 10 L equipped with a thermometer, a stainless steel stirrer, a fractionating column, a dehydration tube, a cooling tube, and a nitrogen introduction tube, and heated to 235° C. with a mantle heater in a nitrogen atmosphere, the reaction was performed for 7 hours, it was confirmed that the reaction rate reached 80% or more, and the reaction was performed at 20 kPa for 1 hour.

Thereafter, after cooling to 160° C., a mixture of styrene and butyl acrylate as the raw material monomer of the styrene resin segment, acrylic acid as the bireactive monomer, and dibutyl peroxide as the polymerization initiator, shown in Table 1, was added dropwise thereto over 1 hour. After completing the dropwise addition, the reaction mixture was held at 160° C. for 1 hour, then the temperature was increased to 200° C., the reaction was performed at 8 kPa for 0.5 hour, then fumaric acid and trimellitic anhydride were added, the reaction was performed under ordinary pressure for 1 hour, then the temperature was increased to 210° C., the reaction was performed for 1 hour, and then the reaction was performed at 8 kPa until the target softening point was obtained, thereby providing an amorphous polyester resin H-21. The reaction rate herein means a value of (amount of reaction water formed/theoretical amount of water formed)× 100.

Production Example H22 (Resin H-22)

The raw material monomers except for fumaric acid and trimellitic anhydride, the esterification catalyst, and the promoter shown in Table 1 were placed in a four-neck flask having a capacity of 10 L equipped with a thermometer, a stainless steel stirrer, a fractionating column, a dehydration tube, a cooling tube, and a nitrogen introduction tube, and heated to 235° C. with a mantle heater in a nitrogen atmosphere, the reaction was performed for 7 hours, it was confirmed that the reaction rate reached 80% or more, the temperature was decreased to 190° C., fumaric acid and trimellitic anhydride were added, the temperature was increased to 210° C. at a rate of 10° C./h, then the reaction was performed under ordinary pressure for 1 hour, and then the reaction was performed at 8 kPa until the target softening point was obtained, thereby providing an amorphous polyester resin H-22.

Production Example H23 (Resin H-23)

The raw material monomers except for trimellitic anhydride, the esterification catalyst, and the promoter shown in Table 1 were placed in a four-neck flask having a capacity of 10 L equipped with a thermometer, a stainless steel stirrer, a fractionating column, a dehydration tube, a cooling tube, and a nitrogen introduction tube, and heated to 235° C. with a mantle heater in a nitrogen atmosphere, the reaction was performed for 7 hours, it was confirmed that the reaction rate reached 80% or more, the temperature was decreased to 210° C., trimellitic anhydride was added, the reaction was performed under ordinary pressure for 1 hour, and then the reaction was performed at 8 kPa until the target softening point was obtained, thereby providing an amorphous polyester resin H-23.

Production Example H24 (Resin H-24)

The raw material monomers except for trimellitic anhydride, the esterification catalyst, and the promoter shown in Table 1 were placed in a four-neck flask having a capacity of 10 L equipped with a thermometer, a stainless steel stirrer, a fractionating column, a dehydration tube, a cooling tube, and a nitrogen introduction tube, and heated to 185° C. with a mantle heater in a nitrogen atmosphere, the reaction was performed for 5 hours, the temperature was increased to 220° C. at 10° C./h, it was confirmed that the reaction rate reached 80% or more at 220° C., the temperature was decreased to 210° C., trimellitic anhydride was added, the reaction was performed under ordinary pressure for 1 hour, and then the reaction was performed at 8 kPa until the target softening point was obtained, thereby providing an amorphous polyester resin H-24.

Production Example H25 (Resin H-25)

The raw material monomers except for fumaric acid and trimellitic anhydride, the esterification catalyst, and the promotor shown in Table 1 were placed in a four-neck flask having a capacity of 10 L equipped with a thermometer, a stainless steel stirrer, a fractionating column, a dehydration tube, a cooling tube, and a nitrogen introduction tube, and heated to 235° C. with a mantle heater in a nitrogen atmosphere, the reaction was performed for 7 hours, it was confirmed that the reaction rate reached 80% or more, and the reaction was performed at 20 kPa for 1 hour.

Thereafter, after cooling to 160° C., a mixture of styrene and 2-ethylhexyl acrylate as the raw material monomer of the styrene resin segment, acrylic acid as the bireactive monomer, and dibutyl peroxide as the polymerization initiator, shown in Table 1, was added dropwise thereto over 1 hour. After completing the dropwise addition, the reaction mixture was held at 160° C. for 1 hour, then the temperature was increased to 200° C., the reaction was performed at 8 kPa for 0.5 hour, then fumaric acid and trimellitic anhydride were added, the reaction was performed under ordinary pressure for 1 hour, then the temperature was increased to 210° C., the reaction was performed for 1 hour, and then the reaction was performed at 8 kPa until the target softening point was obtained, thereby providing an amorphous polyester resin H-25.

TABLE 1

| | | | Production Example | | | | | | | | | |
|---|---|---|---|---|---|---|---|---|---|---|---|---|
| | | | Production Example H21 | | Production Example H22 | | Production Example H23 | | Production Example H24 | | Production Example H25 | |
| | | | Resin | | | | | | | | | |
| | | | Resin H-21 | | Resin H-22 | | Resin H-23 | | Resin H-24 | | Resin H-25 | |
| | | | part by mol *1 | charged amount (g) | part by mol *1 | charged amount (g) | part by mol *1 | charged amount (g) | part by mol *1 | charged amount (g) | part by mol *1 | charged amount (g) |
| Raw material monomer of polyester and polyester segment | Polyhydroxy-amine | PHA-1 | | | | | | | | | 2.5 (0.51) | 42 |
| | Alcohol component | BPA-PO *4 | 40 | 1960 | 60 | 2940 | 80 | 3920 | | | 40 | 1960 |
| | | BPA-EO *5 | 60 | 2730 | 40 | 1820 | 20 | 910 | | | 60 | 2730 |
| | | 1,2-Propanediol | | | | | | | 50 | 532 | | |
| | | 1,4-Butanediol | | | | | | | 50 | 630 | | |
| | Acid component | Terephthalic acid | 60 | 1394 | 50 | 1162 | 55 | 1278 | 70 | 1627 | 60 | 1394 |
| | | Fumaric acid | 5 | 81 | 10 | 162 | | | | | 5 | 81 |
| | | Dodecenylsuccinic anhydride | | | | | 20 | 750 | | | | |
| | | Trimellitic anhydride | 15 | 403 | 20 | 538 | 15 | 403 | 13 | 349 | 15 | 403 |

TABLE 1-continued

| | | Production Example | | | | | | | | |
|---|---|---|---|---|---|---|---|---|---|---|
| | | Production Example H21 | | Production Example H22 | | Production Example H23 Resin | | Production Example H24 | | Production Example H25 |
| | | Resin H-21 | | Resin H-22 | | Resin H-23 | | Resin H-24 | | Resin H-25 |
| Promoter | Gallic acid monohydrate (% by mass) | 0.03 | 2.0 | 0.03 | 2.0 | 0.03 | 2.2 | 0.03 | 0.9 | 0.03 | 2.0 |
| Catalyst | Tin(II) 2-ethylhexanoate (% by mass) | 0.5 | 33 | 0.5 | 33 | 0.5 | 36 | 0.5 | 16 | 0.5 | 33 |
| Bireactive monomer | Acrylic acid | 6 | 60 | | | | | | | 6 | 60 |

| | | part by mass *2 | charged amount (g) | part by mass *2 | charged amount (g) | part by mass *2 | charged amount (g) | part by mass *2 | charged amount (g) | part by mass *2 | charged amount (g) |
|---|---|---|---|---|---|---|---|---|---|---|---|
| Raw material monomer of styrene resin segment | Styrene | 90 | 1492 | | | | | | | 84 | 1392 |
| | 2-Ethylhexyl acrylate | | | | | | | | | 16 | 265 |
| | Butyl acrylate | 10 | 166 | | | | | | | | |

| | | % by mass *3 | charged amount (g) | % by mass *3 | charged amount (g) | % by mass *3 | charged amount (g) | % by mass *3 | charged amount (g) | % by mass *3 | charged amount (g) |
|---|---|---|---|---|---|---|---|---|---|---|---|
| Polymerization initiator | Dibutyl peroxide | 6 | 99 | | | | | | | 6 | 99 |

| | | | | | | |
|---|---|---|---|---|---|---|
| Polyester segment/acrylic resin segment ratio | | 80/20 | — | — | — | 80/20 |
| Acid/alcohol ratio of polyester | | 0.905 | 0.900 | 0.975 | 0.895 | 0.905 |
| Acid/(alcool + polyhydroxyamine) ratio of polyester | | 0.905 | 0.900 | 0.975 | 0.895 | 0.872 |
| Properties of resin | Acid value (mg KOH/g) | 26.1 | 20.5 | 26.5 | 12.6 | 26.1 |
| | Number average molecular weight (Mn) | 4500 | 4900 | 4200 | 5500 | 4500 |
| | Softening point (° C.) | 129.6 | 132.8 | 137.5 | 130.6 | 129.6 |
| | Glass transition temperature (° C.) | 58.4 | 62.3 | 55.6 | 59.4 | 58.4 |
| | Crystallinity index | 2.09 | 2.02 | 2.31 | 2.03 | 2.05 |

*1 molar number per 100 moles of total amount of alcohol component, with numeral in parentheses indicating blended amount (% by mass) based on total amount of resin monomers
*2 part by mass per 100 parts by mass of total amount of raw material monomer of styrene resin segment
*3 % by mass based on total amount of raw material monomer of styrene resin segment
*4 BPA-PO: polyoxypropylene(2.2)-2,2-bis(4-hydroxyphenyl)propane
*5 BPA-EO: polyoxyethylene(2.0)-2,2-bis(4-hydroxyphenyl)propane
PHA-1: 2-amino-2-hydroxymethyl-1,3-propanediol Production Examples L21 to L23, L25, L26, and L28 (Resins L-21 to L-23, L-25, L-26, and L-28)

The raw material monomer, the esterification catalyst, and the promoter shown in Table 2 were placed in a four-neck flask having a capacity of 10 L equipped with a thermometer, a stainless steel stirrer, a fractionating column, a dehydration tube, a cooling tube, and a nitrogen introduction tube, and heated to 235° C. with a mantle heater in a nitrogen atmosphere, the reaction was performed for 10 hours, it was confirmed that the reaction rate reached 80% or more, and the reaction was performed at 8 kPa until the target softening point was obtained, thereby providing amorphous polyester resins L-21 to L-23, L-25, L-26, and L-28.

Production Example L24 (Resin L-24)

The raw material monomer, the esterification catalyst, and the promoter shown in Table 2 were placed in a four-neck flask having a capacity of 10 L equipped with a thermometer, a stainless steel stirrer, a fractionating column, a dehydration tube, a cooling tube, and a nitrogen introduction tube, and heated to 160° C. with a mantle heater in a nitrogen atmosphere, and a mixture of styrene and 2-ethylhexyl acrylate for the styrene resin segment, acrylic acid as the bireactive monomer, and dibutyl peroxide as the polymerization initiator shown in Table 2 was added dropwise thereto over 1 hour. After completing the dropwise addition, the reaction mixture was held at 160° C. for 1 hour, then the temperature was increased to 235° C., the reaction was performed for 10 hours, it was confirmed that the reaction rate reached 80% or more, and the reaction was performed at 20 kPa until the target softening point was obtained, thereby providing an amorphous polyester resin L-24.

Production Example L27 (Resin L-27)

The raw material monomer, the esterification catalyst, and the promoter shown in Table 2 were placed in a four-neck flask having a capacity of 10 L equipped with a thermometer, a stainless steel stirrer, a fractionating column, a dehydration tube, a cooling tube, and a nitrogen introduction tube, and heated to 235° C. with a mantle heater in a nitrogen atmosphere, the reaction was performed for 10 hours, it was confirmed that the reaction rate reached 80% or more, and the reaction was performed at 8 kPa until the target softening point was obtained, thereby providing an amorphous polyester resin L-27.

TABLE 2

| | | | Production Example | | | | | | | |
|---|---|---|---|---|---|---|---|---|---|---|
| | | | Production Example L21 | | Production Example L22 | | Production Example L23 | | Production Example L24 | |
| | | | Resin | | | | | | | |
| | | | Resin L-21 | | Resin L-22 | | Resin L-23 | | Resin L-24 | |
| | | | part by mol *1 | charged amount (g) | part by mol *1 | charged amount (g) | part by mol *1 | charged amount (g) | part by mol *1 | charged amount (g) |
| Raw material monomer of polyester and polyester segment | Polyhydroxy-amine | PHA-1 | 4 (1.0) | 68 | 12 (2.9) | 203 | 2 (0.5) | 34 | 5 (1.0) | 85 |
| | | PHA-2 | | | | | | | | |
| | | PHA-3 | | | | | | | | |
| | Alcohol component | BPA-PO *4 | 80 | 3920 | 80 | 3920 | 80 | 3920 | 20 | 980 |
| | | BPA-EO *5 | 20 | 910 | 20 | 910 | 20 | 910 | 80 | 3640 |
| | Acid component | Terephthalic acid | 80 | 1859 | 80 | 1859 | 80 | 1859 | 92 | 2138 |
| | | Trimellitic anhydride | 5 | 134 | 5 | 134 | 5 | 134 | | |
| Promoter | | Gallic acid monohydrate (% by mass) | 0.03 | 2.1 | 0.03 | 2.1 | 0.03 | 2.1 | 0.03 | 2.1 |
| Catalyst | | Tin(II) 2-ethylhexanoate (% by mass) | 0.5 | 34 | 0.5 | 35 | 0.5 | 34 | 0.5 | 35 |
| Bireactive monomer | | Acrylic acid | | | | | | | 6 | 60 |
| | | | part by mass *2 | charged amount (g) | part by mass *2 | charged amount (g) | part by mass *2 | charged amount (g) | part by mass *2 | charged amount (g) |
| Raw material monomer of styrene resin segment | | Styrene | | | | | | | 84 | 1450 |
| | | 2-Ethylhexyl acrylate | | | | | | | 16 | 276 |
| | | | % by mass *3 | charged amount (g) | % by mass *3 | charged amount (g) | % by mass *3 | charged amount (g) | % by mass *3 | charged amount (g) |
| Polymerization initiator | | Dibutyl peroxide | | | | | | | 6 | 104 |
| Polyester/styrene + acrylic | | | — | | — | | — | | 4.0 | |
| Polyester segment/acrylic resin segment ratio | | | — | | — | | — | | 80/20 | |
| Acid/alcohol ratio of polyester | | | 0.875 | | 0.875 | | 0.875 | | 0.950 | |
| Acid/(alcook-polyhydroxyamine) ratio of polyester | | | 0.825 | | 0.742 | | 0.850 | | 0.884 | |
| Properties of resin | Acid value (mg KOH/g) | | 16.2 | | 12.5 | | 10.5 | | 16.7 | |
| | Number average molecular weight (Mn) | | 2400 | | 2600 | | 2700 | | 2400 | |
| | Softening point (° C.) | | 102.4 | | 103.5 | | 104.6 | | 101.5 | |
| | Glass transition temperature (° C.) | | 61.2 | | 60.1 | | 62.1 | | 56.7 | |
| | Crystallinity index | | 1.58 | | 1.62 | | 1.58 | | 1.68 | |
| | | | Production Example | | | | | | | |
| | | | Production Example L25 | | Production Example L26 | | Production 7 Example L2 | | Production Example L28 | |
| | | | Resin | | | | | | | |
| | | | Resin L-25 | | Resin L-26 | | Resin L-27 | | Resin L-28 | |
| | | | part by mol *1 | charged amount (g) | part by mol *1 | charged amount (g) | part by mol *1 | charged amount (g) | part by mol *1 | charged amount (g) |
| Raw material monomer of polyester and polyester segment | Polyhydroxy-amine | PHA-1 | | | | | | | 40 (9.1) | 683 |
| | | PHA-2 | 4 (1.0) | 68 | | | | | | |
| | | PHA-3 | | | 4 (1.0) | 68 | | | | |
| | Alcohol component | BPA-PO *4 | 80 | 3920 | 80 | 3920 | 80 | 3920 | 80 | 3920 |
| | | BPA-EO *5 | 20 | 910 | 20 | 910 | 20 | 910 | 20 | 910 |
| | Acid component | Terephthalic acid | 80 | 1859 | 80 | 1859 | 80 | 1859 | 80 | 1859 |
| | | Trimellitic anhydride | 5 | 134 | 5 | 134 | 5 | 134 | 5 | 134 |
| Promoter | | Gallic acid monohydrate (% by mass) | 0.03 | 2.1 | 0.03 | 2.1 | 0.03 | 2.0 | 0.03 | 2.3 |
| Catalyst | | Tin(II) 2-ethylhexanoate (% by mass) | 0.5 | 34 | 0.5 | 34 | 0.5 | 34 | 0.5 | 38 |
| Bireactive monomer | | Acrylic acid | | | | | | | | |

TABLE 2-continued

| | | part by mass *2 | charged amount (g) | part by mass *2 | charged amount (g) | part by mass *2 | charged amount (g) | part by mass *2 | charged amount (g) |
|---|---|---|---|---|---|---|---|---|---|
| Raw material monomer of styrene resin segment | Styrene 2-Ethylhexyl acrylate | | | | | | | | |

| | | % by mass *3 | charged amount (g) | % by mass *3 | charged amount (g) | % by mass *3 | charged amount (g) | % by mass *3 | charged amount (g) |
|---|---|---|---|---|---|---|---|---|---|
| Polymerization initiator | Dibutyl peroxide | | | | | | | | |

| | | | | | | | | |
|---|---|---|---|---|---|---|---|---|
| Polyester/styrene + acrylic | | — | | — | | — | | — |
| Polyester segment/acrylic resin segment ratio | | — | | — | | — | | — |
| Acid/alcohol ratio of polyester | | 0.875 | | 0.875 | | 0.875 | | 0.875 |
| Acid/(alcool + polyhydroxyamine) ratio of polyester | | 0.825 | | 0.825 | | 0.875 | | 0.545 |
| Properties of resin | Acid value (mg KOH/g) | 10.5 | | 16.7 | | 15.8 | | 16.2 |
| | Number average molecular weight (Mn) | 2700 | | 2400 | | 2500 | | 2400 |
| | Softening point (° C.) | 104.6 | | 101.5 | | 104.3 | | 102.4 |
| | Glass transition temperature (° C.) | 62.1 | | 56.7 | | 60.9 | | 61.2 |
| | Crystallinity index | 1.59 | | 1.66 | | 1.63 | | 1.56 |

*1 molar number per 100 moles of total amount of alcohol component, with numeral in parentheses indicating blended amount (% by mass) based on total amount of resin monomers
*2 part by mass per 100 parts by mass of total amount of raw material monomer of styrene resin segment
*3 % by mass based on total amount of raw material monomer of styrene resin segment
*4 BPA-PO: polyoxypropylene(2.2)-2,2-bis(4-hydroxyphenyl)propane
*5 BPA-EO: polyoxyethylene(2.0)-2,2-bis(4-hydroxyphenyl)propane
PHA-1: 2-amino-2-hydroxymethyl-1,3-propanediol
PHA-2: 2-amino-2-hydroxyethyl-1,3-propanediol
PHA-3: 2-amino-2-methyl-1,3-propanediol Production Examples C21 and C22 (Resins C-21 and C-22)

The raw material monomers, the esterification catalyst, and the promoter shown in Table 3 were placed in a four-neck flask having a capacity of 10 L equipped with a thermometer, a stainless steel stirrer, a fractionating column, a dehydration tube, a cooling tube, and a nitrogen introduction tube, and heated to 140° C. with a mantle heater in a nitrogen atmosphere, the reaction was performed 5 hours, the temperature was increased to 200° C. at 10° C./h, it was confirmed that the reaction rate reached 80% or more at 200° C., and the reaction was performed at 8 kPa until the target softening point was obtained, thereby providing crystalline polyester resins C-21 and C-22.

Production Example C23 (Resin C-23)

The raw material monomers, the esterification catalyst, and the promoter shown in Table 3 were placed in a four-neck flask having a capacity of 10 L equipped with a thermometer, a stainless steel stirrer, a fractionating column, a dehydration tube, a cooling tube, and a nitrogen introduction tube, and heated to 140° C. with a mantle heater in a nitrogen atmosphere, the reaction was performed 5 hours, the temperature was increased to 200° C. at 10° C./h, it was confirmed that the reaction rate reached 80% or more at 200° C., and the reaction was performed at 8 kPa until the target softening point was obtained, thereby providing a crystalline polyester resin C-23.

TABLE 3

| | | | Production Example | | | | | |
|---|---|---|---|---|---|---|---|---|
| | | | Production Example C21 | | Production Example C22 | | Production Example C23 | |
| | | | | | Resin | | | |
| | | | Resin C-21 | | Resin C-22 | | Resin C-23 | |
| | | | part by mol *1 | charged amount (g) | part by mol *1 | charged amount (g) | part by mol *1 | charged amount (g) |
| Raw material monomer of polyester | Polyhydroxyamine | PHA-1 | | | | | 11 (5.1) | 268 |
| | Alcohol component | 1,10-Decanediol | 100 | 2436 | | | 100 | 2436 |
| | | 1,12-Dodecanediol | | | 100 | 2828 | | |
| | Acid component | Sebacic acid | 100 | 2828 | | | 100 | 2828 |
| | | Dodecanedioic acid | | | 100 | 3220 | | |
| Promoter | | Gallic acid monohydrate (% by mass) | 0.03 | 1.6 | 0.03 | 1.8 | 0.03 | 1.6 |
| Esterification Catalyst | | Tin(II) 2-ethylhexanoate (% by mass) | 0.5 | 26 | 0.5 | 30 | 0.5 | 26 |
| | Acid/alcohol ratio of polyester | | 1.000 | | 1.000 | | 1.000 | |
| | Acid/(alcool + polyhydroxyamine) ratio of polyester | | 1.000 | | 1.000 | | 0.858 | |
| Properties of resin | Acid value (mg KOH/g) | | 15.9 | | 22.8 | | 14 | |
| | Number average molecular weight (Mn) | | 4000 | | 4300 | | 4800 | |

TABLE 3-continued

|  | Production Example C21 | | Production Example C22 | | Production Example C23 | |
|---|---|---|---|---|---|---|
|  | Resin C-21 | | Resin C-22 | | Resin C-23 | |
|  | part by mol *1 | charged amount (g) | part by mol *1 | charged amount (g) | part by mol *1 | charged amount (g) |
| Softening point (° C.) |  | 82.3 |  | 88.2 |  | 83.5 |
| Melting point (° C.) |  | 80.9 |  | 84.5 |  | 82.4 |
| Crystallinity index |  | 1.02 |  | 1.04 |  | 1.01 |

*1 molar number per 100 moles of total amount of alcohol component, with numeral in parentheses indicating blended amount (% by mass) based on total amount of resin monomers
PHA-1: 2-amino-2-hydroxymethyl-1,3-propanediol

[Production of Toner for Electrophotography]
Examples and Comparative Examples 100 parts by mass of a binder resin obtained by mixing the resins shown in Table 4, 5 parts by mass of "Regal 330R" (produced by Cabot Corporation, carbon black), 1 part by mass of a negative charge controlling agent "LR-147" (produced by Japan Carlit Co., Ltd.), and 2 parts by mass of a release agent "NP-105" (produced by Mitsui Chemicals, Inc., propylene wax, melting point: 140° C.) were stirred with a Henschel mixer, and then melt-kneaded with a co-rotation twin screw extruder having a total length of the kneading part of 1,560 mm, a screw diameter of 42 mm, and a barrel inner diameter of 43 mm. The rotation speed of the roll was 200 r/min, the heating temperature inside the roll was 120° C., the supplying rate of the mixture was 10 kg/hr, and the average retention time thereof was approximately 18 seconds. The resulting kneaded material was rolled and cooled with a cooling roller, and powder having a volume median particle diameter ($D_{50}$) of 6.5 μm was obtained with a jet mil.

To 100 parts by mass of the resulting powder, 1.0 part by mass of "Aerosil R-972" (hydrophobic silica, produced by Nippon Aerosil Co., Ltd., average particle diameter: 16 nm) and 1.0 part by mass of "SI-Y" (hydrophobic silica, produced by Nippon Aerosil Co., Ltd., average particle diameter: 40 nm) as external additives were added and mixed with a Henschel mixer at 3,600 r/min for 5 minutes, so as to perform an external addition treatment, thereby providing a toner having a volume median particle diameter ($D_{50}$) of 6.5 μm. The resulting toner was evaluated and shown in Table 4.

TABLE 4

|  | Binder resin | | | | | | Polyhydroxyamine compound | | | | Evaluation | |
|---|---|---|---|---|---|---|---|---|---|---|---|---|
|  |  |  |  |  |  |  |  | % by mass | | % by mass | | |
|  | Kind | part by mass | Kind | part by mass | Kind | part by mass | Kind | in added resin *1 | Added resin | in total resin *2 | Fog ΔE | Odor suppression |
| Example 21 | H-21 | 65 | L-21 | 30 | C-21 | 5 | PHA-1 | 1.0 | L-21 | 0.30 | 0.7 | 3.7 |
| Example 22 | H-21 | 65 | L-22 | 30 | C-21 | 5 | PHA-1 | 2.9 | L-22 | 0.87 | 0.9 | 3.9 |
| Example 23 | H-21 | 65 | L-23 | 30 | C-21 | 5 | PHA-1 | 0.5 | L-23 | 0.15 | 1.2 | 3.2 |
| Example 24 | H-21 | 65 | L-24 | 30 | C-21 | 5 | PHA-2 | 1.0 | L-24 | 0.30 | 0.9 | 2.7 |
| Example 25 | H-21 | 65 | L-25 | 30 | C-21 | 5 | PHA-3 | 1.0 | L-25 | 0.30 | 1 | 2.5 |
| Example 26 | H-21 | 65 | L-26 | 30 | C-21 | 5 | PHA-1 | 1.0 | L-26 | 0.30 | 0.8 | 3.6 |
| Example 27 | H-21 | 65 | L-21 | 30 | C-22 | 5 | PHA-1 | 1.0 | L-21 | 0.30 | 0.8 | 3.8 |
| Example 28 | H-21 | 65 | L-21 | 30 | C-23 | 5 | PHA-1 | 1.0 | L-21 | 0.30 | 1.1 | 3.1 |
|  |  |  |  |  |  |  | PHA-1 | 5.1 | C-23 | 0.25 |  |  |
| Example 29 | H-25 | 65 | L-21 | 30 | C-21 | 5 | PHA-1 | 0.5 | L-21 | 0.33 | 1.3 | 3.3 |
|  |  |  |  |  |  |  | PHA-1 | 1.0 | L-21 | 0.30 |  |  |
| Example 30 | H-22 | 65 | L-21 | 30 | C-21 | 5 | PHA-1 | 1.0 | L-21 | 0.30 | 1.2 | 3.7 |
| Example 31 | H-23 | 65 | L-21 | 30 | C-21 | 5 | PHA-1 | 1.0 | L-21 | 0.30 | 1.3 | 3.6 |
| Example 32 | H-24 | 65 | L-21 | 30 | C-21 | 5 | PHA-1 | 1.0 | L-21 | 0.30 | 1.6 | 3.5 |
| Comparative Example 21 | H-21 | 65 | L-27 | 30 | C-21 | 5 | — | 0 | — | 0 | 2.4 | 1.1 |
| Comparative Example 22 | H-21 | 65 | L-28 | 30 | C-21 | 5 | PHA-1 | 9.1 | L-28 | 2.73 | 2.0 | 3.9 |

*1 blended amount (% by mass) based on total amount of monomers of blended resin
*2 blended amount (% by mass) based on total amount of binder resin of toner
PHA-1: 2-amino-2-hydroxymethyl-1,3-propanediol
PHA-2: 2-amino-2-hydroxyethyl-1,3-propanediol
PHA-3: 2-amino-2-methyl-1,3-propanediol It can be understood from the above that the toners for electrophotography of Examples of the present invention exhibit an excellent fog suppression capability by containing the particular polyhydroxyamine compound, as compared to the toners for electrophotography of Comparative Examples.

The invention claimed is:

1. A toner for electrophotography comprising a resin A comprising at least a polyester moiety obtained through polycondensation of (i), (ii) and (iii):

(i) an alcohol component,
(ii) a carboxylic acid component, and
(iii) a polyhydroxyamine component represented by the following formula (1) in an amount of 0.01% by mass or more and 5.0% by mass or less based on the total amount of all the monomer components of the resin A:

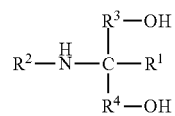  (1)

wherein $R^1$ represents a hydroxyalkyl group having a number of carbon atoms of 1 or more and 5 or less; $R^2$ represents a hydrogen atom, an alkyl group having a number of carbon atoms of 1 or more and 6 or less, or a hydroxyalkyl group having a number of carbon atoms of 1 or more and 5 or less; and $R^3$ and $R^4$ each represent an alkanediyl group having a number of carbon atoms of 1 or more and 5 or less, provided that $R^3$ and $R^4$ may be the same as or different from each other.

2. The toner for electrophotography according to claim 1, wherein the polyhydroxyamine component is at least one selected from the group consisting of 2-amino-2-hydroxymethyl-1,3-propanediol and 2-amino-2-hydroxyethyl-1,3-propanediol.

3. The toner for electrophotography according to claim 1, wherein the polyhydroxyamine component is 2-amino-2-hydroxymethyl-1,3-propanediol.

4. The toner for electrophotography according to claim 1, wherein the toner comprises an amorphous resin and a crystalline resin, and
at least one selected from the group consisting of the amorphous resin and the crystalline resin is the resin A.

5. The toner for electrophotography according to claim 1, wherein the toner comprises an amorphous resin H, an amorphous resin L having a softening point that is lower by 20° C. or more than the amorphous resin H, and a crystalline resin C, and
at least one selected from the group consisting of the amorphous resin L and the crystalline resin C is the resin A.

6. A binder resin comprising a resin A comprising at least a polyester moiety obtained through polycondensation of (i), (ii) and (iii):
(i) an alcohol component,
(ii) a carboxylic acid component, and
(iii) a polyhydroxyamine component represented by the formula (1) in an amount of 0.01% by mass or more and 5.0% by mass or less based on the total amount of all the monomer components of the resin A:

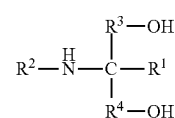  (1)

wherein $R^1$ represents a hydroxyalkyl group having a number of carbon atoms of 1 or more and 5 or less; $R^2$ represents a hydrogen atom, an alkyl group having a number of carbon atoms of 1 or more and 6 or less, or a hydroxyalkyl group having a number of carbon atoms of 1 or more and 5 or less; and $R^3$ and $R^4$ each represent an alkanediyl group having a number of carbon atoms of 1 or more and 5 or less, provided that $R^3$ and $R^4$ may be the same as or different from each other.

7. The binder resin according to claim 6, wherein the polyhydroxyamine component is at least one selected from the group consisting of 2-amino-2-hydroxy methyl-1,3-propanediol and 2-amino-2-hydroxyethyl-1,3-propanediol.

8. The binder resin according to claim 6, wherein the polyhydroxyamine component is 2-amino-2-hydroxymethyl-1,3-propanediol.

* * * * *